United States Patent
Williams

[15] 3,698,686
[45] Oct. 17, 1972

[54] BUTTERFLY TYPE FLUID CONTROL VALVES

[72] Inventor: William Williams, Newport, England

[73] Assignee: Serck Industries Limited, Birmingham, England

[22] Filed: Oct. 10, 1969

[21] Appl. No.: 865,317

[30] Foreign Application Priority Data

Oct. 15, 1968 Great Britain..........48,847/68

[52] U.S. Cl................................................251/306
[51] Int. Cl.................................................F16k 1/228
[58] Field of Search.......251/306, 307, 170, 171, 173

[56] References Cited

UNITED STATES PATENTS

| | | | |
|---|---|---|---|
| 2,980,388 | 4/1961 | White | 251/298 X |
| 3,025,035 | 3/1962 | Swain | 251/306 |
| 3,156,445 | 11/1964 | Swain | 251/307 X |
| 3,250,510 | 5/1966 | Williams | 251/173 |
| 3,282,558 | 11/1966 | Swain | 251/173 X |

FOREIGN PATENTS OR APPLICATIONS

| | | | |
|---|---|---|---|
| 927,502 | 5/1963 | Great Britain | 251/306 |
| 302,526 | 12/1928 | Great Britain | 251/306 |

*Primary Examiner*—Henry T. Klinksiek
*Attorney*—Holman & Stern

[57] ABSTRACT

The closure vane of a butterfly valve is formed at its periphery with a part-spherical surface which is engageable with a seat ring. The seat ring is free to move in a plane perpendicular to the axis of the valve passage. The pivotal axis of the vane is offset both from the center of the spherical surface and from the axis of the valve passage, so that as the vane starts to open, its periphery lifts away from the seat ring.

3 Claims, 1 Drawing Figure

PATENTED OCT 17 1972 3,698,686
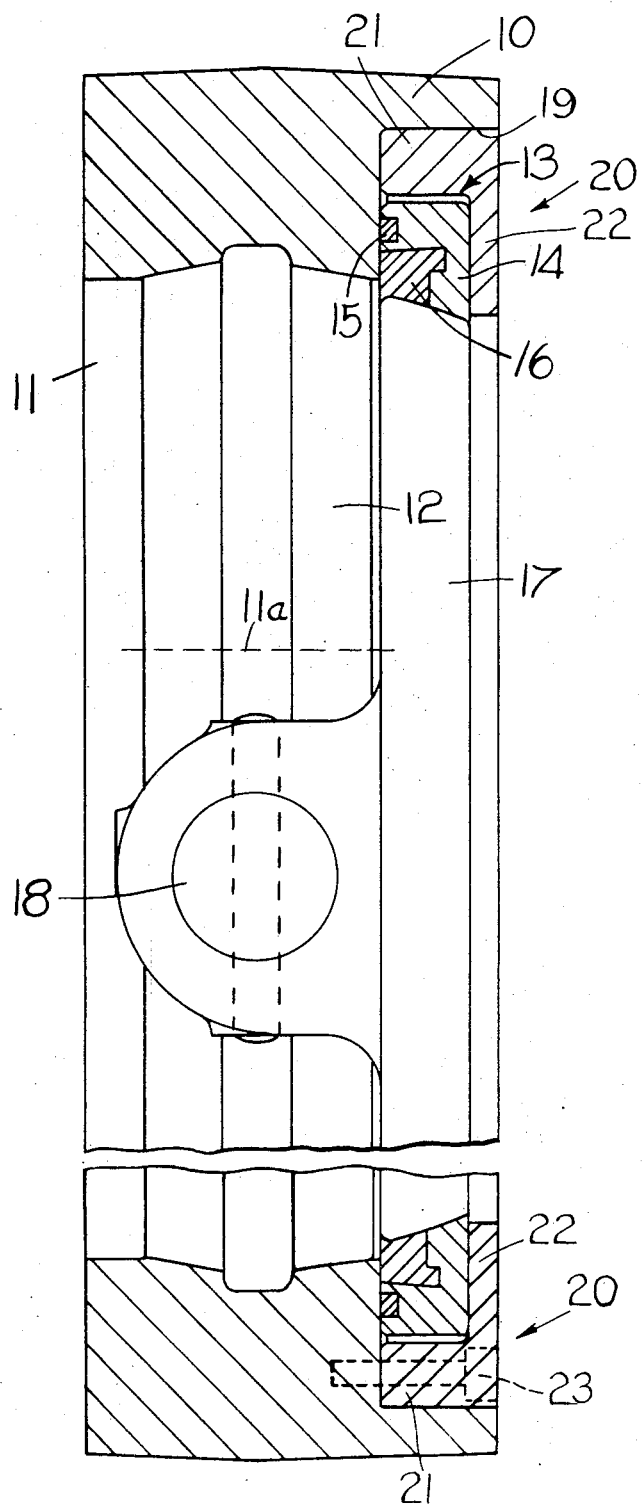
INVENTOR
William Fredrick Williams
BY Holman, Glascock,
Downing & Seebold
ATTORNEYS

BUTTERFLY TYPE FLUID CONTROL VALVES

This invention relates to butterfly type fluid control valves and has an object to provide such a valve in a convenient form.

A butterfly type fluid control valve in accordance with the invention comprises a body having a through passage, said body being provided with an internal circular recess at one end of the through passage, a detachable annular retaining member positioned in the recess provides an internal annular groove, a mounting ring within the annular groove and displaceable in the groove a plane perpendicular to the axis of the through passage, a sealing element positioned between the mounting ring and the body, a seat ring carried by the mounting ring, said seat ring having an inner face extending into the passage and a face engaging the body inwardly of the sealing element, a valve closure member defined by a disc having a part spherical peripheral surface, means pivotally mounting the disc to the body to be axially offset from the plane of the disc and from the axis of the through passage, the part spherical peripheral surface of the disc being engageable with the inner face of the seat ring, and when the valve is shut, the center of the part spherical peripheral surface of the disc is the same distance from the plane of the disc as the axis of the pivotal mounting means, and the center of the part spherical peripheral surface lies on the axis of the through passage.

Reference is now made to the accompanying drawing which is a somewhat diagrammatic cross-sectional view of one example of a butterfly type valve in accordance with the invention.

The valve shown includes a body 10 having a through passage 11. The passage 11 passes through a valve chamber 12 at one end of which there is an internal circular recess 19. An annular retaining member denoted generally 20 is provided with a first flange 21 and a second flange 22 extending at right angles to the flange 21. The flange 21 is located in the recess and the length of the flange is substantially equal to the depth of the recess 19 so that the outer surface of the flange 22 is flush with the body 10. The outer diameter of the retaining member 20 substantially corresponds to the outer diameter of the recess. The member 20 is detachably secured to the body 10 by means of bolts or the like 23. It will be appreciated that the retaining member 20 together with the base of the recess 19 provides an annular groove 13. Within the groove 13 is a mounting ring 14 which is displaceable in a plane perpendicular to the axis 11a of the through passage 11. The mounting ring 14 carries a sealing element 15 which engages the body 10 and also carries a seat ring 16 which has an inner face extending into the valve chamber 12 and also has a face engaging the body 10. Both the sealing element 15 and the seat ring 16 are resiliently deformable.

Mounted in the valve chamber 12 is a closure member 17 which is in the form of a disc having a part spherical peripheral surface. The disc is pivotally mounted by means of a spindle 18 which is offset axially from the plane of the disc 17 and is also offset from the axis 11a of a passage 11. The spherical peripheral surface of the disc 17 has its center at a point which lies on the axis 11a of the passage 11 when the disc extends in a plane perpendicular to the axis of the passage 11. When the disc is in this position, the center of the part spherical surface is offset from the plane of the ring 14 by the same distance as is the axis of the spindle 18.

With a valve as above described, fluid tight closing of the valve does not rely on an interference fit between the valve disc and its seat as in conventional butterfly valves. The combination of the offset of the axis of the spindle 18 both from the plane of the disc 17 and from the center of the peripheral surface of the disc 17 causes the periphery to lift away from the seat ring 16 as the disc 17 is rotated anticlockwise as seen in the drawing, thus closing pressure can be applied to the disc through the intermediary of the external operating mechanism thereof (not shown) so that the disc is actually pressed against the seat ring 16. Any inaccuracies in the dimensions of the disc 17, ring 14 or seat ring 16 are taken into account in this construction since, in the case where the disc 17 is undersized, the spindle 18 is turned beyond its normal closed position and the ring 16 can slide to a new radial position to take into account the radial displacement of the spherical center from the axis 11a of the passage 11. Thus, inaccuracies which arise during manufacture of the valve as well as inaccuracies which arise as a result of wear of the valve are taken into account.

Having thus described my invention what I claim as new and desire to secure by Letters Patent is:

1. A butterfly type fluid control valve comprising a body having a through passage, said body being provided with an internal circular recess at one end of the through passage, an annular retaining member having a first flange and a second flange extending at right angles to the first flange, said first flange being positioned in the recess, with said flanges cooperating with the recess to provide an internal annular groove, means detachably securing the annular retaining member to the body, a mounting ring within the annular groove and displaceable in the groove in a plane perpendicular to the axis of the through passage, a sealing element positioned between the mounting ring and the body, a seat ring carried by the mounting ring, said seat ring having an inner face extending into the passage and a face engaging the body inwardly of the sealing element, a valve closure member defined by a disc having a part spherical peripheral surface, means pivotally mounting the disc to the body to be axially offset from the plane of the disc and from the axis of the through passage, the part spherical peripheral surface of the disc being engageable with the inner face of the seat ring, and when the valve is shut, the center of the part spherical peripheral surface of the disc is the same distance from the plane of the disc as the axis of the pivotal mounting means and the center of the surface lies on the axis of the through passage.

2. The valve as claimed in claim 1 in which the seat ring is resiliently deformable.

3. The valve as claimed in claim 1 in which movement of the closure member about its pivotal mounting means is such that in its open position the plane of the closure member lies on a side of the axis of the passage opposite to the said pivotal mounting means.

* * * * *